(12) United States Patent
Zhao et al.

(10) Patent No.: US 10,516,654 B2
(45) Date of Patent: Dec. 24, 2019

(54) SYSTEM, APPARATUS AND METHOD FOR KEY PROVISIONING DELEGATION

(71) Applicant: Intel Corporation, Santa Clara, CA (US)

(72) Inventors: Meiyuan Zhao, Santa Clara, CA (US); Jesse Walker, Hillsboro, OR (US); Xiruo Liu, Piscataway, NJ (US); Steffen Schulz, Darmstadt (DE); Jianqing Zhang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 15/070,166

(22) Filed: Mar. 15, 2016

(65) Prior Publication Data
US 2017/0272415 A1 Sep. 21, 2017

(51) Int. Cl.
*H04L 29/06* (2006.01)
*H04W 12/06* (2009.01)

(52) U.S. Cl.
CPC ........ *H04L 63/061* (2013.01); *H04L 63/0807* (2013.01); *H04L 63/0884* (2013.01); *H04W 12/06* (2013.01)

(58) Field of Classification Search
CPC ............... H04L 63/061; H04L 63/0897; H04L 63/0884; H04W 12/06
See application file for complete search history.

(56) References Cited

U.S. PATENT DOCUMENTS

| | | | | |
|---|---|---|---|---|
| 5,729,608 | A * | 3/1998 | Janson | H04L 9/0827 380/30 |
| 8,347,100 | B1 * | 1/2013 | Thornewell | H04L 9/3247 713/176 |
| 8,650,401 | B2 * | 2/2014 | Wiseman | H04L 63/061 380/256 |
| 9,705,673 | B2 * | 7/2017 | Bar-El | H04L 9/0877 |
| 2006/0020797 | A1 * | 1/2006 | Zhang | G06F 21/31 713/169 |

(Continued)

OTHER PUBLICATIONS

International Searching Authority, "Notification of Transmittal of the International Search Report and the Written Opinion of the International Searching Authority," dated Apr. 25, 2017 in International application No. PCT/US2017/013860.

(Continued)

*Primary Examiner* — Sher A Khan
(74) *Attorney, Agent, or Firm* — Trop, Pruner & Hu, P.C.

(57) ABSTRACT

In one embodiment, a computing device includes at least one hardware processor to execute instructions, a network interface to enable communication with a second computing device and a third computing device, and at least one storage medium. Such medium may store instructions that when executed by the computing device enable the computing device to request delegation of a key provisioning privilege for the second computing device from the third computing device via a parent-guardian delegation protocol comprising a three-party key distribution protocol with the second computing device and the third computing device, the three-party key distribution protocol having interposed therein a two-party authenticated key exchange protocol between the computing device and the third computing device. Other embodiments are described and claimed.

21 Claims, 6 Drawing Sheets

(56) References Cited

U.S. PATENT DOCUMENTS

| | | | |
|---|---|---|---|
| 2008/0175393 A1* | 7/2008 | Oba | H04L 63/062 380/279 |
| 2012/0008784 A1* | 1/2012 | Hallam-Baker | H04L 9/083 380/278 |
| 2013/0145442 A1 | 6/2013 | Activcard | |
| 2013/0326596 A1* | 12/2013 | Hohlfeld | G06F 21/6218 726/5 |
| 2014/0161260 A1 | 6/2014 | Wu et al. | |
| 2014/0289509 A1* | 9/2014 | Baghdasaryan | G06Q 20/42 713/155 |
| 2015/0263855 A1* | 9/2015 | Schulz | H04L 9/0827 713/155 |
| 2016/0366102 A1* | 12/2016 | Smith | H04L 63/045 |

OTHER PUBLICATIONS

U.S. Appl. No. 14/977,753, filed Dec. 22, 2015, entitled "System, Apparatus and Method for Transferring Ownership of a Smart Delivery Package," by Rajesh M. Poornachandran, et al.

U.S. Appl. No. 14/865,191, filed Sep. 25, 2015, entitled "System, Apparatus and Method for Multi-Owner Transfer of Ownership of a Device," by Jesse Walker, et al.

U.S. Appl. No. 14/670,874, filed Mar. 27, 2015, entitled "Technologies for Trusted Device On-Boarding," Ned M. Smith, et al.

* cited by examiner

SYSTEM, APPARATUS AND METHOD FOR KEY PROVISIONING DELEGATION

BACKGROUND

The Internet of Things (IoT) is rapidly developing as a new communication and interaction paradigm that enables many new vertical collections or networks of disparate devices, such as smart homes, smart city, industrial control and smart transportation. Secure grouping and key establishment between edge devices such as sensors and actuators can be difficult, as such devices can have heterogeneous and potentially limited compute capabilities. This property can limit interaction for certain protocols and further limit management of membership keys and credentials.

DETAILED DESCRIPTION

In various embodiments, a computing device within an IoT network can be provided with a delegation status, such that it may act as a key provisioning authority for one or more other devices. This delegation may be obtained from an owner entity, such as an owner computing device of an owner of the IoT network or other management computing device. This owner device is also referred to herein as a parent device, as it is a parent with regard to one or more IoT devices in the IoT network, referred to herein as child or children devices. To this end, a child device and the parent device may have a pre-established trust relationship in which the child device stores therein a parent key that indicates that the parent device is the parent of the child device.

A framework as described herein for delegation-based key provisioning may address trust establishment and key provisioning in IoT networks, particularly for edge IoT devices. To this end, embodiments may leverage a device's parent key(s), and parent trust establishment to delegate certain privileges to a new party, referred to herein as a guardian, to enable the IoT edge device to establish a shared key securely with the new party, which thus acts as the edge device's guardian.

Such delegation can occur to address a variety of considerations. First, IoT edge devices have highly heterogeneous capabilities. Protocols for establishing mutual trust and keys described herein can support capable devices as well as highly resource-constrained devices. Second, establishment of IoT device keys may be average user-friendly, which conventionally causes the protocol to either leverage a trusted public key infrastructure (PKI) that is transparent to the user, or to remove dependency on trusted servers but minimize dependency on manual interaction by users. Traditional PKI or Kerberos services can be challenging to establish at a global scale, and may require substantial IT professional expertise as well as computational resources for cryptographic processing. On the other hand, solutions for key provisioning without a server are often insecure, such as pre-shared key approaches, lacking resilience by working directly with fixed manufacture/device keys, or involving cumbersome and critical manual interaction such as pairing. Embodiments thus address these issues.

Using embodiments described herein, the parent device may delegate various privileges, including key provisioning privileges, to a delegate device, referred to herein as a guardian device. By delegation of such privileges, the guardian device may enter into given trust relationships with one or more child devices. As examples herein, the child devices may be relatively minimally compute complex devices such as IoT devices, e.g., having sensing, actuation and/or other functionality.

Figure 1:
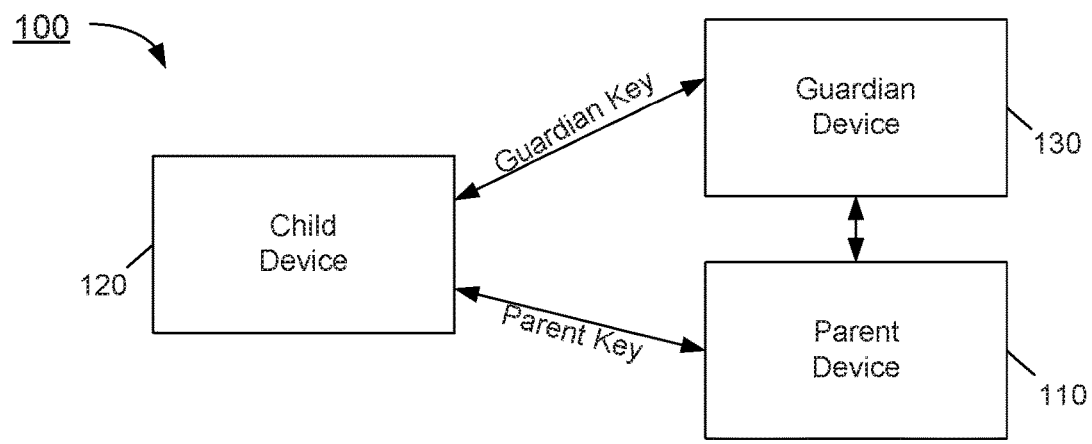
FIG. 1 is a block diagram of a portion of an IoT network in accordance with an embodiment.

Referring now to FIG. 1, shown is a block diagram of a portion of an IoT network in accordance with an embodiment. As shown in FIG. 1, IoT network 100 may be any type of computing network including various computing devices that couple together, e.g., in wired or wireless manners. Some devices may be continuously connected, while other devices may be occasionally connected. As illustrated, IoT network 100 includes a parent device 110. In various embodiments, parent device 110 may be, but not necessarily, a relatively more capable computing device, such as a server computer, gateway device, router, personal computer, smartphone, or any other type of computing device. In an embodiment, parent device 110 may be a computing system of a manufacturer, namely a manufacturer of a child device 120. Parent device 110 has a trust relationship with child device 120. For purposes of discussion herein, assume that child device 120 is an edge IoT device, and may be implemented as a sensor, actuator, or so forth. To indicate its trust relationship and parenthood status with regard to child device 120, parent device 110 may provision a parent key into a non-volatile storage of child device 120. In an embodiment, this non-volatile storage may be a secure storage, accessible only in a trusted execution environment (TEE) of child device 120. In some cases, this TEE may be implemented using separate hardware circuitry, such as a separate microcontroller from a main processor (such as a central processing unit (CPU)) of child device 120.

As further illustrated in FIG. 1, a guardian device 130 is also present in network 100. In various embodiments, guardian device 130 may take the form of a gateway, smartphone, or consumer computer with an installed delegation protocol package. As an example, guardian device may be a central authority for a domain (such as an entire IoT network or a portion thereof). In some cases, guardian device 130 may couple to parent device 110 and/or child device 120 only for purposes of security operations within the IoT network, such as provisioning of one or more security credentials within child device 120, such as a membership credential for an IoT domain and/or a long term key to represent a trust relationship. In some cases, a child and/or guardian device may be portable devices such that they can enter into trust relationships as described herein for multiple IoT domains. As one example, a smartphone, wearable device or so forth, may be introduced into a home network and a work network of a user, among others.

While guardian device 130 and parent device 110 may have a pre-established trust relationship. In many cases this may not be the case. Instead, when a new child device (such as child device 120) is provisioned into IoT network 100, guardian device 130 (or child device 120 itself) may initiate contact in an effort to obtain delegate status for guardian device 130 with regard to child device 120.

Thus in the embodiment of FIG. 1, the two parties to establish a trust relationship represented by a key are C and G (Child and Guardian), where a third party P (Parent) has an existing parent key provisioned to C. With the delegation provided herein, key provisioning between C and G can occur, given that P is a trusted third party to provide authentication and authorization of G to C. With this authorization decision, P may delegate a certain subset of (or all) privileges to G, temporarily or permanently. Effectively, G now becomes a guardian (or a new parent) for C, represented by an established key, referred to as a guardian key, between C and G. In the case of full privilege transfer, the established guardian key is considered the new parent key for the C and G, which now becomes the new P for C. The key provisioning process thus allows P to delegate a subset or all of its privilege on C to G, as represented by the original permission key from P to C. Hence, the terms "primary (permission/privilege) key," "master key," or "parent key" may be used interchangeably to refer to the key shared between P and C.

In this way, embodiments enable key provisioning for a resource-constrained edge device with another relatively more capable device in an IoT network. In an embodiment, this key may be a symmetric secret key shared between two IoT devices, where the child can be very resource-constrained, and the guardian is relatively more capable so that it can authenticate itself to a remote parent device and receive delegation as the basis of key provisioning.

Delegation of key provisioning in accordance with an embodiment can be applied to a wide variety of use cases. As one example, the key provisioning by delegation can be used as a membership enrollment protocol for an IoT domain, where a membership credential is a unique symmetric key that a domain authority shares with each member. The domain authority works as the new guardian, leveraging an enrollee device (Child) and its parent key (with Parent). The enrollment protocol thus is invoked for an enrollee device to establish a trust relationship with the domain authority, authorized by the enrollee device's parent, which in fact facilitates establishment of such new trust relationship.

As another example, the delegation techniques can also be used for a special function delegation. For instance, a symmetric attestation scheme may involve the Parent as established Verifier to delegate the capability for the Guardian (a new Verifier) to challenge and verify the Prover (Child) using a symmetric attestation key. Embodiments may further support provisioning an additional Verifier (Guardian) for the same Prover. In such cases, a fresh unique key may be established between the Prover and new Verifier, with the original Verifier's authorization and delegation. A device provisioning function that establishes a new root of trust key for a device could also use the above protocol.

A still further use case can be applied to an ownership transfer protocol, which allows the original owner (Parent) to transfer all its privilege on the target device (Child) to the new owner (Guardian). In this case, a new ownership key is established on the Child, and replaces the old ownership key as the root of trust.

A protocol in accordance with an embodiment may minimize the overhead on the child device to provision a secret key, making it possible for minimally complex IoT edge devices to operate with secure interactions. Compared with public key certificates, embodiments implement only symmetric key operations and secure storage for at least a single symmetric key and protected key operations with the stored key. In addition, unlike a Kerberos system, the child device is not required to have secure clock synchronization. Furthermore, the protocol can be implemented with a minimal number of protocol messages handled by the child device. Embodiments can thus minimize the computation and power costs to a child device, such that lightweight devices like sensors, actuators, and microcontroller units (MCUs) can be provisioned with secret keys securely.

A protocol as described herein also may be performed with no manual intervention from the user for key provisioning. Compared with traditional key provisioning protocols that do not rely on server or key infrastructure, such as secure pairing, there is no manual operation by user on an out-of-band (OOB) channel. Instead, the device parent party is leveraged as the trusted third party to facilitate trust establishment. Such design reduces human error, hence increasing usability. And it removes the requirement of close proximity for key provisioning, as required by most OOB channels requiring manual operations by human, increasing the chance of practical deployment.

Embodiments may further realize stronger security on provisioned keys as compared with existing pairing protocols. In an example embodiment described herein, a delegation protocol can leverage two different protocols, namely a three-party key distribution protocol (3PKD) and a two-party SIGMA protocol, for parent-guardian authentication. In this way, embodiments have a strong security guarantee, in contrast to pairing protocols that do not have security proof (which cause them to be troublesome due to possible man-in-the-middle attacks and frequent human errors in their manual operations). Embodiments may realize, without IT professional expertise, key provisioning and server management. The key provisioning complexity is shifted to an edge device's parent party and the guardian device.

Delegation as described herein can serve as cryptographic core of general-purpose key provisioning, where established keys may represent various trust relationships with different scope, semantics and criticality/impact.

Figure 2:
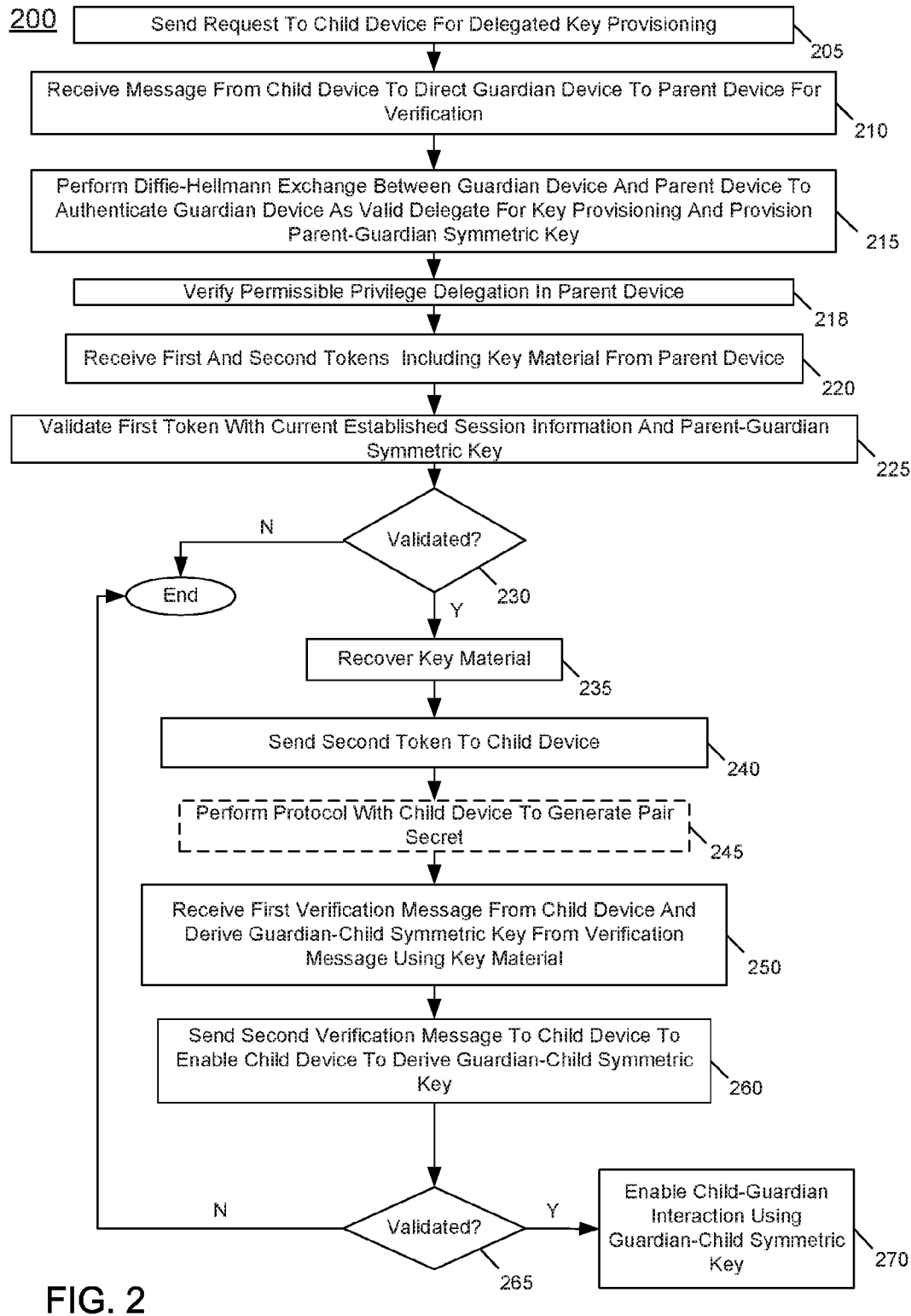
FIG. 2 is a flow diagram of a method in accordance with an embodiment of the present invention.

Referring now to FIG. 2, shown is a flow diagram of a method in accordance with an embodiment of the present invention. More specifically, method 200 shown in FIG. 2 may be performed by hardware, software, firmware (and/or combinations thereof) of a guardian device to enable a delegation of one or more privileges from a parent device to the guardian device on behalf of a child device. As seen, method 200 begins by sending a request to the child device for delegated key provisioning (block 205). In some embodiments, the guardian device may initiate this request responsive to identification of a new child device within an IoT network. In other cases, this request may be responsive to receipt of a message from the child device (or even from a parent device) for such delegation. In any event, control passes next to block 210 where a message may be received from the child device. This message may provide information regarding the parent device (as it may be assumed in some instances that the guardian device is not aware of a parentage of the child device). More specifically, this message may direct the guardian device to the parent device for authorization and verification. Note that at this point there is no trust established between the guardian device and the child device, and as such, this plaintext message is sent via an open channel. Note that the messages at this stage are not protected, as the protocol execution in later part will be effective in confirming all parties' commitment securely.

Still with reference to FIG. 2, at block 215 an authenticated Diffie-Hellman key exchange, e.g., via a SIGn and MAc (SIGMA) protocol may be performed between the guardian device and the parent device. More specifically, this exchange may be performed to authenticate the guardian device as a valid delegate for key provisioning. The result of this exchange may be generation of a shared secret key between the parent device and the guardian device, referred to herein as a parent-guardian symmetric key. This symmetric secret key represents this newly established trust relationship. The key can be long term or ephemeral, chosen by the system implementation. Understand that while an example embodiment described is in the context of a Diffie-Hellman exchange protocol, embodiments are not so limited, and in other embodiments other types of negotiations and protocols may be used to establish this trust relation and key exchange.

The parent device may perform checks to determine that: (1) child device is indeed a device that parent device has requested privilege on (according to parent's local database/record); and (2) guardian device is compliant with the policy of delegation, so that it is an authorized party to receive the requested delegation of privilege for the child device (block 218). Then control passes to block 220 where the guardian device may receive tokens from the parent device. Such tokens may include key material to be used in derivation of key provisioning for the child device and the guardian device. In an embodiment, the parent device may send two tokens, one including the key material and directed to the guardian device, and a second token, also including the same key material, and to be directed (via the guardian device) to the child device. Next at block 225, the guardian device may validate the first token with current established session information and the parent-guardian symmetric key. If it is determined that the message is validated (as received from the parent device within the current established session (determined at diamond 230)), control passes to block 235 where the guardian device may recover the key material from the token and store it in an appropriate storage of the guardian device for further confirmation. Control next passes to block 240 where the second token is sent to the child device. Note that the child device also may validate the token based on session information (and a previously established parent key stored in the child device) and obtain the same key material for local storage.

Still with reference to FIG. 2, at block 245 an optional process may be performed to enter into a negotiation protocol with the child device to generate a pair secret. Note that this pair secret may be generated and used in further communications. This may be the case to provide further secrecy protection against the parent device. That is, as the parent device is the provider of the key material, without this separate pair secret, the parent device could snoop and intrude on communications between the guardian device and the child device.

In any event, control passes to block 250 where the guardian device receives a first verification message from the child. From this verification message, which includes the session information and tag information, the guardian device may derive a guardian-child symmetric key using the key material. By validating the tag on the message from Child, which was computed from the derived guardian-child confirmation key, the guardian device can confirm that the Child device agrees with the current session and agrees that the token passed by the guardian indeed carries the parent device's authorization for delegation. In addition, the guardian device at block 260 sends a second verification message to the child device. This verification message includes the session information and tag information, and may in turn be used by the child device to confirm that both the parent device and guardian device have consistent identification of this session and have reached the agreement on the delegation. The session identification information and the key material are then used to derive the guardian-child symmetric key.

Thereafter, at diamond 265 it can be determined whether the three-party key agreement binding with the current session is validated. In an embodiment, this can be determined by confirming that the received verification message includes the same identifier of the child as received in the original message received from the child device (from block 210, discussed above), and vice versa. Thus at this point, all three parties have reached the agreement of the delegation and key provision. That is, the child device is convinced that the parent device has authorized the delegation to the guardian device on the child device, and both guardian and parent have reached the agreement. Also, the guardian device is convinced that it has gained the delegation as authorized by the parent device and the child device has agreed that it is indeed its parent device, and agrees with the delegation. Thus, the guardian device and the child device have authenticated each other, facilitated by the parent device, and authorized by the parent device to establish a shared key that can be used to enable their further interaction (block 270). Understand while shown at this high level in the embodiment of FIG. 2, many variations and alternatives are possible.

As mentioned above, in an embodiment, to enable the delegation and subsequent key provisioning, two different protocols may be overlaid together. More specifically, in one embodiment a first protocol is a Three-Party Key Distribution protocol (3PKD) between C, G, and P. In this protocol, P acts as a key distribution server, which conventionally has an existing trust relationship with C and G respectively. However in embodiments P and G may not have an existing trust relationship yet. Hence, a second protocol is overlaid to enable P and G to authenticate on demand. An example protocol for P/G authentication as described herein is a SIGn and MAc or SIGMA protocol, which is performed between P and G over an open channel. Alternatively, P and G could leverage a secure channel already established between them, if such security channel can represent P's trust on G that delegates G the privilege to establish a key with C.

The following discussion illustrates the messages communicated between the parties involved in the protocol, in one embodiment, as described further below as to FIG. 3:

1. G sends Message 1 as a request to C to establish a trust relationship and a symmetric key to represent such trust;
2. C has no knowledge regarding G, but sends back Message 2 to direct G to P for further authentication and verification;
   a. Message 2 contains identity information for all 3 parties, and initial random nonces from C and G for a protocol session;
3. G forwards Message 2 as Message 3 to C's parent party P;
4. P receives Message 3, and may validate the following:
   a. G can be authenticated
   b. C is indeed its child entity
   c. Requested privilege on C can be authorized to G
   d. Authorization decision could be based on G's identity and an additional data structure for the authorization. Understand that in different embodiments, various information may be included in the authorization data structure. Such data structure may be sent and verified by C and G in protocol exchange with Messages 4-6;

5. G and P engage in a mutual authentication in Messages 4-6, and optionally verification of authorization credentials for delegation;
   a. Message 4: P sends SIGMA Message 1 with all three nonces (enhanced 3-party context) and its DH public value. This works as a challenge to G to reduce the chance of a denial of service (DoS) attack on P;
   b. Message 5: G sends SIGMA Message 2 with the enhanced protocol context (e.g., matching IDs and all three nonces) and its own DH public value. G signs DH public values with its public key certificate, and then computes a MAC on G's own identity, further bound with C's identity using the derived key from both parties DH values;
   c. Message 6: P parses and validates Message 5, and sends back SIGMA Message 3 with matching protocol context, signing DH public values in reverse order with its own public key certificate, and computes the MAC on P's own identity, using the same derived key;

6. G validates the signature and MAC on Message 6 to complete mutual authentication. At this point, G and P have established a fresh secret symmetric key ek derived from DH handshake and the current session information;

7. Message 6 overlays additional data structures as part of the 3PKD, namely two key provisioning tokens, upon making delegation decision to G;
   a. P as key provisioning server, generates a random key material k, to be delivered to both G and C;
   b. P generates token α for G, which includes authenticated data for this protocol instance, {IDs ∥ nonces}, and encrypts the key material k using ek;
   c. P generates associated token β for C, which includes the same authenticated data for this protocol instance, {IDs ∥ nonces}, and encrypts the key material k using kek, which is the existing parent key that P has established with C, prior to this protocol execution;
   d. P sends both tokens to G in Message 6, in addition to SIGMA authentication data structures;

8. G completes authentication with Message 6, then parses and validates token α that matches the current protocol session and decrypts α to recover k, which implies G receives an authorization from P;

9. G forwards token β to C, in Message 7, to further confirm with C whether they can reach the agreement that P has granted authorization to this delegation bounding to the same session;

10. As an option, G and C could further engage in an additional exchange locally to establish a pair secret ps. This pair secret may be used as a contribution to the session information and further derivation, so that P has no knowledge of the established key between G and C;

11. C validates the token with matching session information, then recovers the same key material k;

12. Message 8 and Message 9 are created by C and G, respectively and validated by G and C, respectively, to complete the 3PKD protocol to confirm the matching session information, and consistency in the provided key material from P, therefore all three parties reach the agreement that the delegation has been properly granted and confirmed by C, P, and G, and derive sk, as the final outcome of the protocol.

At this point, the protocol concludes with the successful establishment of a secret key between G and C to represent their trust relationship delegated by P. Stated another way, at completion of the protocol all three parties confirm they reached three-party agreement on the delegation. This is typically referred to as a matching conversation. For agreement on delegation, the result of the protocol is that: (1) C agrees that P and G are corresponding parties in the delegation as P and G, and P and G know that C agrees; (2) P agrees that G can be authorized to receive delegation on C, and both C and G know that P agrees; and (3) G agrees that P has successfully authorized the delegation to C and C is indeed P's child, and C and P know that G agrees.

Figure 3:
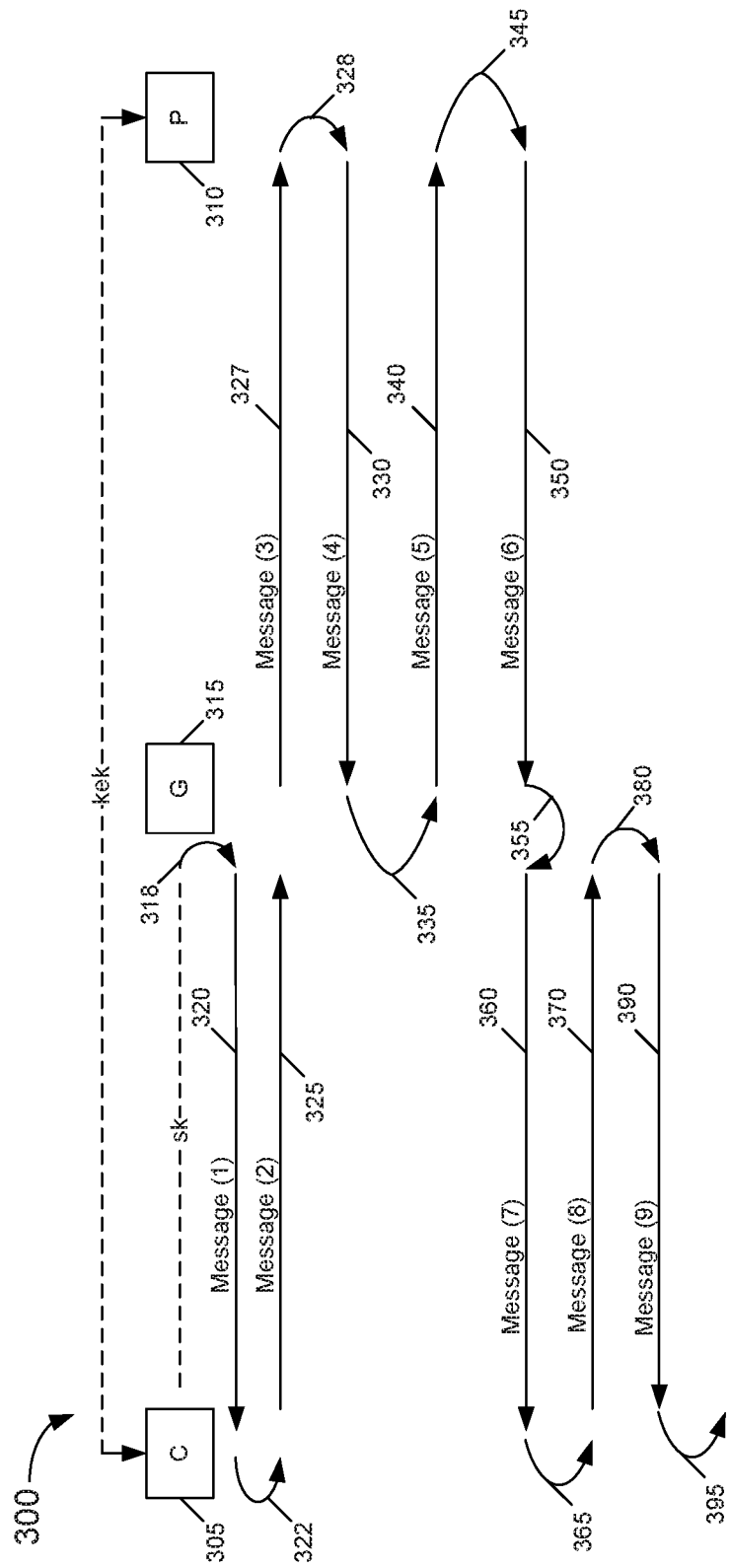
FIG. 3 is a flow diagram of a protocol flow in accordance with an embodiment of the present invention.

Referring now to FIG. 3, shown is a flow diagram of a protocol flow in accordance with an embodiment of the present invention. FIG. 3 shows a protocol flow 300 that incorporates both a 3PKD protocol and a SIGMA protocol. More specifically, elements of the 3PKD protocol flow between all of child device 305, guardian device 315 and parent device 310, while elements of the SIGMA protocol flow between guardian device 315 and parent device 310. As illustrated, prior to initiation of the protocol, a parent key kek is provided from parent device 310 to child device 305. Such parent key may be installed in child device 305 during manufacture, in instances where parent device 310 is of the manufacturer of child device 305. As one such example, assume that parent device 310 is a server or other computing device of a manufacturing entity, such as a sensor/actuator device manufacturer, and that child device 305 is a given sensor/actuator that may be implemented as an integrated circuit (IC) including processor circuitry, storage, memory, sensing components or so forth. As further illustrated, the result of the protocol is a shared key sk to be shared between guardian device 315 and child device 305 after valid delegation of key provisioning from parent device 310 to guardian device 315.

Protocol 300 begins at sub-flow 318 in which guardian device 315 may generate a nonce ($N_1$). Guardian device 315 thereafter sends a first message 320 that includes this nonce and an identifier of guardian device 315 ($id_G$). Responsive to receipt of this message, child device 305 executes a sub-flow 322 to generate its own nonce, $N_2$. Thereafter, child device 305 generates a second message 325 that includes both nonces and identifiers for all three devices (including a child identifier ($id_C$) and a parent identifier ($id_P$)). Guardian device 315 upon receipt of this message 325 may forward the message as a third message 327 to parent device 310.

In turn, parent device 310 generates a nonce ($N_3$) and determines a private Diffie-Hellman (DH) key, x. It can be appreciated that DH keys and/or other calculations described herein may be performed under a selected prime modulus. In sub-flow 328, parent device 310 further generates a public DH key, $g^x$, based on its private DH key, x, where the primitive root, g, is a generator for an abelian group under the selected prime modulus used by parent device 310 and guardian device 315 during the key exchange protocol. In turn, parent device 310 sends a fourth message 330 that includes the session context (namely including all three nonces and identifiers), along with the public DH value.

In turn, guardian device 315 performs a sub-flow 335 to generate its own private DH key, y, and sign both public DH values and generate a keyed hash based on the nonces and the shared key, and communicate a fifth message 340 to parent device 310. In turn, parent device 310 may execute sub-flow 345 to verify the certificate of guardian device 315, and verify that the guardian device is authorized to receive a key representing the requested privilege on the child. Still further, parent device 310 may verify the signature on both DH public values and verify that the public DH value of guardian device 315 is an element of the DH group. Responsive to this verification, parent device 310 further generates its own keyed hash to verify the MAC on the fifth message. Parent device 310 further generates key material, k, which may be generated by a random number generator. In addition, parent device 310 further generates tokens, one for each of guardian device 315 and child device 305, that include this key material. In turn, parent device 310 sends a sixth message 350 including these tokens and the signed DH public values in reverse order and its certificate, integrity protected by the MAC computed using the established integrity key between G and P.

At sub-flow 355, guardian device 315 verifies the certificate and the signature and derives ek to decrypt the first token to obtain the keyed material k, which it may store in an appropriate storage. It is to be noted that at this point the DH SIGMA session is completed and this encryption key ek is established between parent device 315 and guardian device 310.

Thereafter, guardian device 315 forwards a seventh message 360 that includes the second token. Child device 305 may decrypt key material k using its parent key kek. In turn, child device 305, after executing sub-flow 365, sends an eighth message 370 to enable guardian device 315 to execute verification sub-flow 380 to verify the session information and derive the shared key sk.

Guardian device 315 then validates token from P indeed contains the same key material authenticated by the session information, and validates that C confirms its parenting relationship with P and C agrees with the delegation. Guardian device 315 then sends its own verification message 390 (including the session information and its identifier) to enable child device 305, at sub-flow 395, confirms G's agreement on delegation and the same key material as authorized by P and to enable child device to generate the shared key sk and validate that the guardian identifier is the same as sent in original message 320.

Thus at this point the protocol concludes and the secret shared key sk represents the trust relationship between child device 305 and guardian device 315, such that they may further interact in a trusted manner. Understand while shown with this particular protocol flow in FIG. 3, many variations and alternatives are possible.

Table 1 below is representative pseudo code that describes one example of protocol flow 300 of FIG. 3, where G represents operations (sub-flows as described above) performed by a guardian device, C represents operations performed by a child device, and P represents operations performed by a parent device.

TABLE 1

```
G: N₁ := rng
G → C: N₁ ‖ id_G                                           -- message 1
C: verify id_G ≠ id_C, N₂ := rng
C → G: N₁ ‖ id_G ‖ N₂ ‖ id_C ‖ id_P                        -- message 2
G: verify N₁, id_G are from message 1, id_C ≠ id_G and id_P ≠ id_G and id_C ≠ id_P
G → P: N₁ ‖ id_G ‖ N₂ ‖ id_C ‖ id_P                        -- message 3, identical to message 2
P: verify id_P is P's own public id, and id_C identifies a device for which P serves as key
distribution center (KDC)
P: verify id_G ≠ id_C and id_G ≠ id_P
P: N₃ := rng, x := rng
P → G: N₁ ‖ id_G ‖ N₂ ‖ id_C ‖ id_P ‖ N₃ ‖ g^x             -- message 4
G: verify N₁, id_G, id_P, N₂, id_C are from message 3, g^x is an element of the DH group
G: y := rng, dk := prf(hash(N₁ ‖ N₂ ‖ N₃), g^xy), ak := prf(dk, 1)
G → P: N₁ ‖ N₂ ‖ N₃ ‖ g^y ‖ sig_G(g^x ‖ g^y) ‖ [id_C ‖ cert_G]_ak   -- message 5
P: verify N₁, N₂, N₃ and cert_G.id = id_G are from message 4
P: verify cert_G, and G is authorized to receive a key for C
P: use cert_G. public-key to verify sig_G(g^x ‖ g^y)
P: verify g^y is an element of the DH group
P: dk := prf(hash(N₁ ‖ N₂ ‖ N₃), g^xy), ak := prf(dk, 1)
P: use ak to verify the MAC tag on [id_C ‖ cert_G]_ak
P: ek: = prf(dk, 2)
P: k := rng, and retrieve the kek P shares with C
P: α := [N₁ ‖ id_G ‖ N₂ ‖ id_P ‖ id_c ‖ N₃ ‖ {k}]_ek
P: β := [N₁ ‖ id_G ‖ N₂ ‖ id_P ‖ id_c ‖ N₃ ‖ {k}]_kek
P → G: α ‖ β ‖ sig_P(g^y ‖ g^x) ‖ [cert_P]_ak              -- message 6
G: verify N₁, id_G, N₂, id_C, id_P, and N₃ are from message 5
G: parse [cert_P]_ak as cert_P, tag', use ak to verify tag', verify cert_P, verify sig_P(g^y ‖ g^x)
G: ek : = prf(dk, 2), use ek to decrypt α as k
G → C: β                                                    -- message 7
C: verify N₁, id_G, N₂, id_C, id_P, are from message 2
C: acquire ps, or ps := null
C: use kek to decrypt β as k
C: sid := hash(N₁ ‖ id_G ‖ N₂ ‖ id_P ‖ id_c ‖ N₃ ‖ ps)
C: ck := prf(k, 1 ‖ sid)
C → G: [sid ‖ id_C]_ck                                      -- message 8
G: parse [sid ‖ id_C]_ck as sid, id_C, tag, verify id_C is from message 2
G: hash(N₁ ‖ id_G ‖ N₂ ‖ id_P ‖ id_c ‖ N₃ ‖ ps)
G: ck := prf(k, 1 ‖ sid), use ck to verify tag
G: sk := prf(k, 2 ‖ sid)
G → C: [sid ‖ id_G]_ck                                      -- message 9
C: parse [sid ‖ id_G]_ck as sid, id_G, tag, verify id_G is from message 1
C: verify sid, use ck to verify tag
C: sk := prf(k, 2 ‖ sid)
End of Protocol
```

Embodiments thus provide a delegation framework to enable key provisioning via trusted third party delegation. Protocols as described herein may be used to establish device domain membership key, attestation key, or even to enable ownership transfer and root key provisioning. With delegation-based symmetric key provisioning as described herein, users may easily create and manage trusted relationships for IoT devices.

Figure 4:
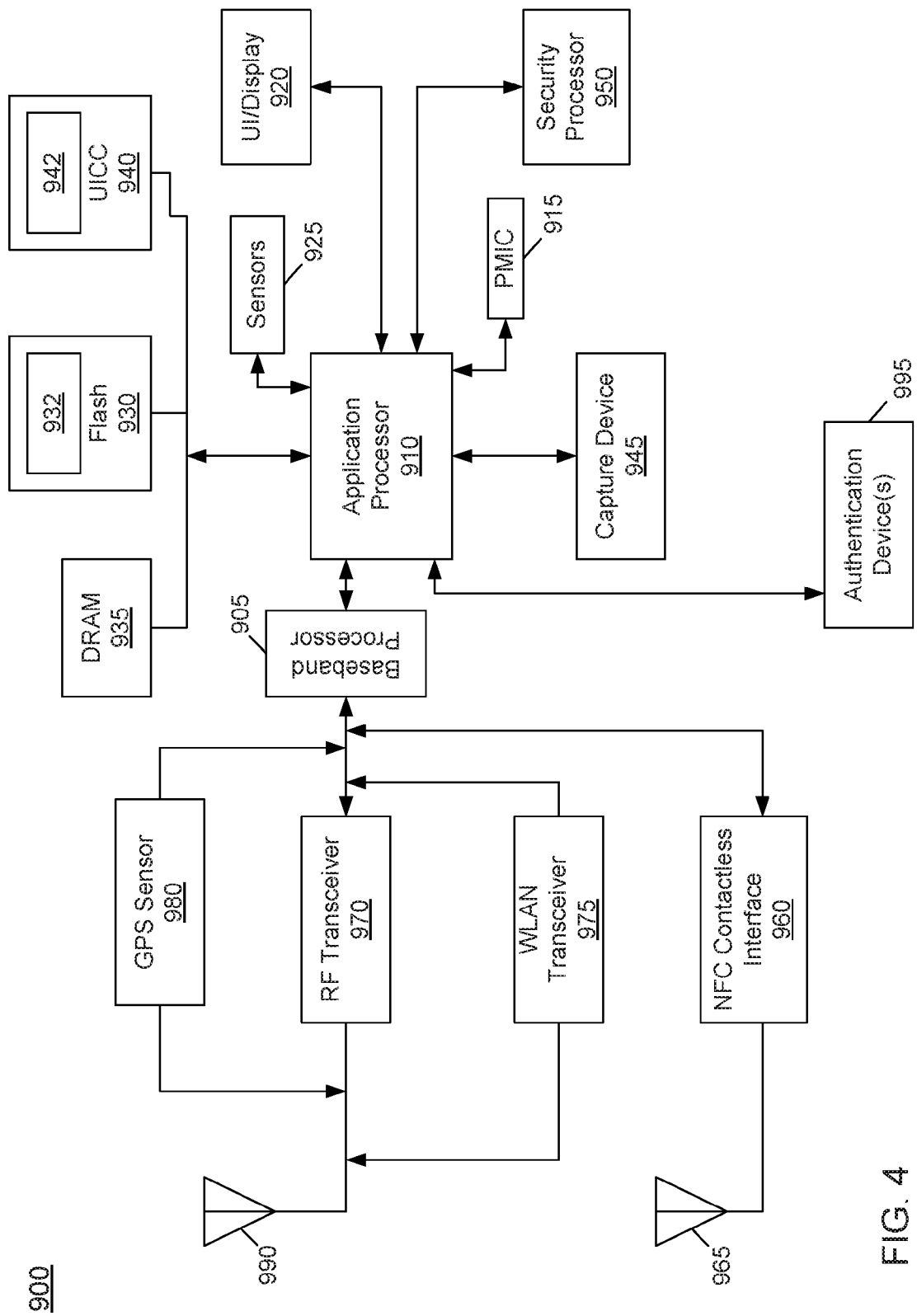
FIG. 4 is a block diagram of an example system with which embodiments can be used.

Referring now to FIG. 4, shown is a block diagram of an example system with which embodiments can be used. As seen, system 900 may be a smartphone or other wireless communicator or any other IoT device. In different examples, system 900 may be a child device or a guardian device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which keys, other secrets and other sensitive information may be stored and operated. One or more of these storages may store a package for performing the privilege delegation protocols described herein. As further seen, application processor 910 also couples to a capture device 945 such as one or more image capture devices that can record video and/or still images.

Still referring to FIG. 4, a universal integrated circuit card (UICC) 940 comprises a subscriber identity module, which in some embodiments includes a secure storage 942 to store secure identity information. System 900 may further include a security processor 950 that may that may implement a trusted execution environment (TEE), and which may couple to application processor 910. Furthermore, application processor 910 may implement a secure mode of operation, such as Intel® Software Guard Extensions (SGX) to a given instruction set architecture, and circuitry for hosting of a TEE. Security processor 950 and/or application processor 910 may be configured to be a child and/or guardian device and may participate in the privilege delegations described herein. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950, which may be used in certain security operations. Other wireless communications such as receipt or transmission of radio signals, e.g., AM/FM and other signals may also be provided. In addition, via WLAN transceiver 75, local wireless communications, such as according to a Bluetooth™ or IEEE 802.11 standard can also be realized.

Figure 5:
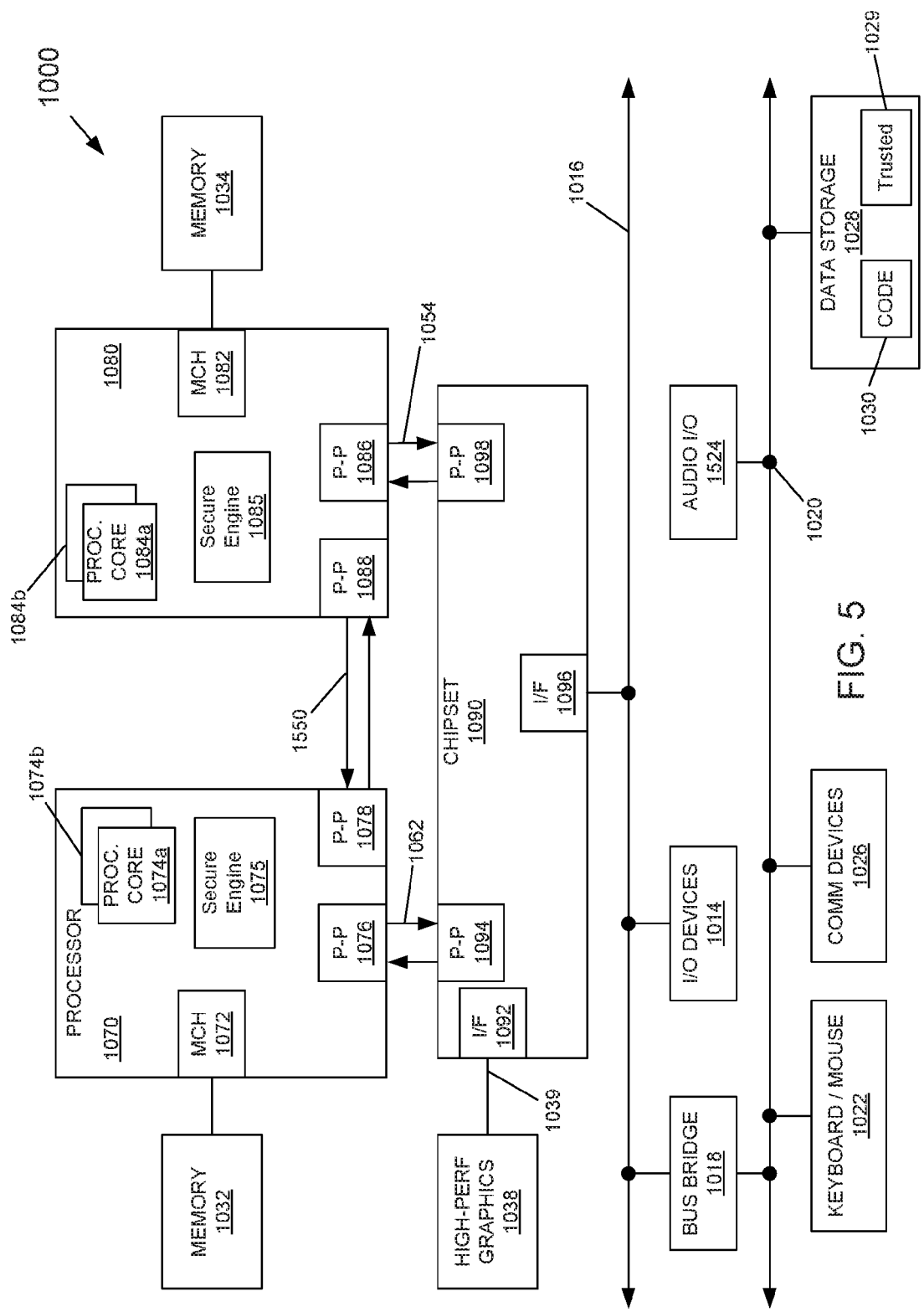
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 may be a parent device, and can be implemented as a point-to-point interconnect system such as a server system. System 1000 includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform the privilege delegation protocols as described herein.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment, including code for performing the privilege delegation protocols described herein. As further seen, data storage unit 1028 also includes a trusted storage 1029 to store sensitive information to be protected. Further, an audio I/O 1024 may be coupled to second bus 1020.

Figure 6:
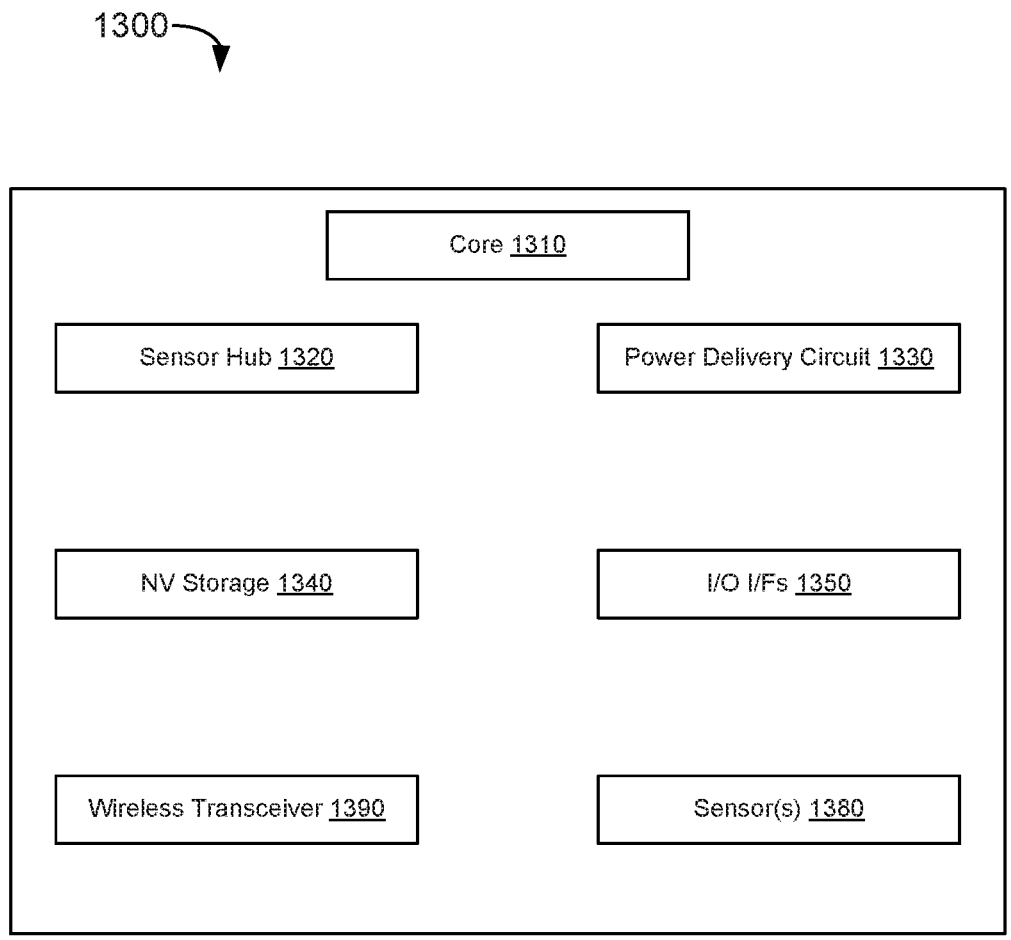
FIG. 6 is a block diagram of a system in accordance with another embodiment of the present invention.

Embodiments may be used in environments where IoT devices may include wearable devices or other small form factor IoT devices such as an actuator and/or sensor. Referring now to FIG. 6, shown is a block diagram of a module 1300 in accordance with another embodiment. In one particular implementation, module 1300 may be an Intel® Curie™ module that includes multiple components adapted within a single small module. Module 1300 may be configured to be a child device and participate in the privilege delegation protocols to generate a shared key with a guardian device with minimal overhead, as described herein. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (I/O) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations an IoT module can take many other forms, that have, in comparison with a typical general purpose CPU or a GPU, a small form factor, low power requirements, limited instruction sets, relatively slow computation throughput, or any of the above.

The following Examples pertain to further embodiments.

In Example 1, a computing device comprises: at least one hardware processor to execute instructions; a network interface to enable communication with a second computing device and a third computing device; and at least one storage medium including instructions that when executed by the computing device enable the computing device to request delegation of a key provisioning privilege for the second computing device from the third computing device via a parent-guardian delegation protocol comprising a three-party key distribution protocol with the second computing device and the third computing device, the three-party key distribution protocol having interposed therein a two-party authenticated key exchange protocol between the computing device and the third computing device.

In Example 2, the at least one storage medium further comprises instructions that when executed enable the computing device to negotiate a first shared key with the third computing device, decrypt key material from the third computing device with the first shared key, send the key material to the second computing device and negotiate a second shared key with the second computing device, and thereafter interact with the second computing device using the second shared key.

In Example 3, the at least one storage medium further comprises instructions that when executed enable the computing device to generate a first nonce and send a first message to the second computing device, the first message including the first nonce and a first identifier of the computing device.

In Example 4, the at least one storage medium further comprises instructions that when executed enable the computing device to receive a second message from the second computing device, the second message including the first nonce, a second nonce, a second identifier of the second computing device, and a third identifier of the third computing device, and verify at least a portion of the second message.

In Example 5, the at least one storage medium further comprises instructions that when executed enable the computing device to forward the second message to the third computing device as a third message.

In Example 6, the at least one storage medium further comprises instructions that when executed enable the computing device to receive a fourth message from the third computing device including a first public key of the third computing device and a context comprising the second message and a third nonce, and verify at least a portion of the fourth message.

In Example 7, the at least one storage medium further comprises instructions that when executed enable the computing device to send a fifth message to the third computing device including the context and a second public key of the second computing device.

In Example 8, the at least one storage medium further comprises instructions that when executed enable the computing device to receive a sixth message from the third computing device including the context, a first token including the key material encrypted by the first shared key and a second token including the key material encrypted by a parent key shared between the second computing device and the third computing device, verify at least a portion of the sixth message and derive the first shared key based at least in part on the sixth message.

In Example 9, the at least one storage medium further comprises instructions that when executed enable the computing device to send a seventh message to the second computing device including the second token, where the second computing device is to decrypt the key material with the parent key.

In Example 10, the at least one storage medium further comprises instructions that when executed enable the computing device after the seventh message is sent, to exchange one or more messages with the second computing device to establish the second shared key and confirm that the second shared key present in the computing device is in agreement with the second shared key present in the second computing device.

In Example 11, the interaction includes at least one of an attestation of the second computing device and an ownership transfer of the second computing device.

In Example 12, upon completion of the parent-guardian delegation protocol, the computing device is to agree that it is a delegate for the second computing device on behalf of the third computing device, and confirm that the second computing device and the third computing device have reached agreement regarding the delegation.

In Example 13, a method comprises: requesting delegation of a key provisioning privilege from a parent device of a device coupled to the computing device and responsive to the request, receiving parent device information from the device; interacting with the parent device to receive the key provisioning privilege delegation, deriving a parent-guardian shared key, and receiving key material from the parent device; and after establishing the parent-guardian shared key, sending the key material to the device, to enable the device and the computing device to establish a guardian-child shared key.

In Example 14, the method of Example 13 further comprises establishing a pair secret between the computing device and the device.

In Example 15, the method of Example 14 further comprises using the pair secret to validate a verification message from the device and responsive to validation of the verification message, deriving the guardian-child shared key.

In Example 16, the method of one or more of the above Examples further comprises using the guardian-child shared key to enroll the device into a network, where the computing device comprises a domain authority for the network.

In Example 17, the method of one or more of the above Examples further comprises using the guardian-child shared key to perform a challenge protocol with the device.

In Example 18, the method of one or more of the above Examples further comprises using the guardian-child shared key to transfer ownership of the device from the parent device to the computing device.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 19, a system comprises: at least one hardware processor to execute instructions; a network interface to enable communication with a second computing device and a third computing device; and at least one storage medium including instructions that when executed by the system enable the system to perform an authenticated key exchange protocol with the second computing device to establish a parent-guardian symmetric key responsive to a privilege delegation request for the second computing device to obtain delegation of at least one privilege for the third computing device, and communicate a first token including key material encrypted with the parent-guardian symmetric key and a second token including the key material encrypted with a parent key of the third computing device, to enable the second computing device and the third computing device to establish a guardian-child symmetric key to be used for at least one delegated privilege.

In Example 20, the at least one storage medium further comprises instructions that when executed enable the system to provision the parent key to the third computing device during manufacture of the third computing device.

In Example 21, the privilege delegation request comprises at least one of a key delegation, an attestation delegation and an ownership delegation.

In Example 22, the at least one storage medium further comprises instructions that when executed enable the system to validate that the system is a parent of the third computing device, authenticate the second computing device, confirm agreement of the parent-guardian symmetric key with the second computing device, and authorize the delegation of the at least one privilege to the second computing device.

In Example 23, a computing device comprises: processor means for executing instructions; network interface means for enabling communication with a second computing device and a third computing device; and means for requesting delegation of a key provisioning privilege for the second computing device from the third computing device via a three-party key distribution protocol with the second computing device and the third computing device, the three-party key distribution protocol having interposed therein a two-party authenticated key exchange protocol between the computing device and the third computing device.

In Example 24, the computing device of Example 23 further comprises: means for negotiating a first shared key with the third computing device, decrypting key material from the third computing device with the first shared key, and sending the key material to the second computing device; and means for negotiating a second shared key with the second computing device, and thereafter interacting with the second computing device using the second shared key.

In Example 25, the computing device of Example 24 further comprises means for generating a first nonce and sending a first message to the second computing device, the first message including the first nonce and a first identifier of the computing device.

In Example 26, the computing device of Example 25 further comprises: means for receiving a second message from the second computing device, the second message including the first nonce, a second nonce, a second identifier of the second computing device, and a third identifier of the third computing device; and means for verifying at least a portion of the second message.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computing device comprising:
   at least one hardware processor to execute instructions;
   a network interface to communicate with a second computing device and a third computing device; and
   at least one non-transitory storage medium including instructions that cause the computing device to request delegation of a key provisioning privilege for the second computing device from the third computing device via a parent-guardian delegation protocol comprising a three-party key distribution protocol with the second computing device and the third computing device, the three-party key distribution protocol having interposed therein a two-party authenticated key exchange protocol between the computing device and the third computing device, including to negotiate a first shared key with the third computing device, decrypt key material from the third computing device with the first shared key, send the key material to the second computing device and negotiate a second shared key with the second computing device, and thereafter interact with the second computing device using the second shared key.

2. The computing device of claim 1, wherein the at least one non-transitory storage medium further comprises instructions that cause the computing device to generate a first nonce and send a first message to the second computing device, the first message including the first nonce and a first identifier of the computing device.

3. The computing device of claim 2, wherein the at least one non-transitory storage medium further comprises instructions that cause the computing device to receive a second message from the second computing device, the second message including the first nonce, a second nonce, a second identifier of the second computing device, and a third identifier of the third computing device, and verify at least a portion of the second message.

4. The computing device of claim 3, wherein the at least one non-transitory storage medium further comprises instructions that cause the computing device to forward the second message to the third computing device as a third message.

5. The computing device of claim 3, wherein the at least one non-transitory storage medium further comprises instructions that cause the computing device to receive a fourth message from the third computing device including a first public key of the third computing device and a context comprising the second message and a third nonce, and verify at least a portion of the fourth message.

6. The computing device of claim 5, wherein the at least one non-transitory storage medium further comprises instructions that cause when executed enable the computing device to send a fifth message to the third computing device including the context and a second public key of the second computing device.

7. The computing device of claim 5, wherein the at least one non-transitory storage medium further comprises instructions that cause the computing device to receive a sixth message from the third computing device including the context, a first token including the key material encrypted by the first shared key and a second token including the key material encrypted by a parent key shared between the second computing device and the third computing device, verify at least a portion of the sixth message and derive the first shared key based at least in part on the sixth message.

8. The computing device of claim 7, wherein the at least one non-transitory storage medium further comprises instructions that cause the computing device to send a seventh message to the second computing device including the second token, wherein the second computing device is to decrypt the key material with the parent key.

9. The computing device of claim 8, wherein the at least one non-transitory storage medium further comprises instructions that cause the computing device after the seventh message is sent, exchange one or more messages with the second computing device to establish the second shared key and confirm that the second shared key present in the computing device is in agreement with the second shared key present in the second computing device.

10. The computing device of claim 1, wherein the interaction includes at least one of an attestation of the second computing device and an ownership transfer of the second computing device.

11. The computing device of claim 1, wherein upon completion of the parent-guardian delegation protocol, the computing device is to agree that it is a delegate for the second computing device on behalf of the third computing device, and confirm that the second computing device and the third computing device have reached agreement regarding the delegation.

12. At least one non-transitory computer readable storage medium comprising instructions that when executed enable a computing device to:
   request delegation of a key provisioning privilege from a parent device of a device coupled to the computing device and responsive to the request, receive parent device information from the device;
   interact with the parent device to receive the key provisioning privilege delegation, negotiate with the parent device to derive a parent-guardian shared key, and receive and decrypt key material from the parent device; and
   after establishment of the parent-guardian shared key, send the key material to the device, to cause the device and the computing device to negotiate to establish a guardian-child shared key, and thereafter interact with the device using the guardian-child shared key.

13. The at least one non-transitory computer readable medium of claim 12, further comprising instructions that cause the computing device to establish a pair secret between the computing device and the device.

14. The at least one non-transitory computer readable medium of claim 13, further comprising instructions that cause the computing device to use the pair secret to validate a verification message from the device and responsive to validation of the verification message, derive the guardian-child shared key.

15. The at least one non-transitory computer readable medium of claim 12, further comprising instructions that cause the computing device to use the guardian-child shared key to enroll the device into a network, wherein the computing device comprises a domain authority for the network.

16. The at least one non-transitory computer readable medium of claim 12, further comprising instructions that cause the computing device to use the guardian-child shared key to perform a challenge protocol with the device.

17. The at least one non-transitory computer readable medium of claim 12, further comprising instructions that cause the computing device to use the guardian-child shared key to transfer ownership of the device from the parent device to the computing device.

18. A system comprising:
at least one hardware processor to execute instructions;
a network interface to communicate with a second computing device and a third computing device; and
at least one non-transitory storage medium including instructions that cause the system to perform an authenticated key exchange protocol with the second computing device to establish a parent-guardian symmetric key responsive to a privilege delegation request for the second computing device to obtain delegation of at least one privilege for the third computing device, and communicate a first token including key material encrypted with the parent-guardian symmetric key and a second token including the key material encrypted with a parent key of the third computing device, to cause the second computing device and the third computing device to establish a guardian-child symmetric key to delegate at least one privilege to interact between the second computing device and the third computing device.

19. The system of claim 18, wherein the at least one non-transitory storage medium further comprises instructions that cause the system to provision the parent key to the third computing device during manufacture of the third computing device.

20. The system of claim 18, wherein the privilege delegation request comprises at least one of a key delegation, an attestation delegation and an ownership delegation.

21. The system of claim 18, wherein the at least one non-transitory storage medium further comprises instructions that cause the system to validate that the system is a parent of the third computing device, authenticate the second computing device, confirm agreement of the parent-guardian symmetric key with the second computing device, and authorize the delegation of the at least one privilege to the second computing device.

* * * * *